(12) United States Patent
Court et al.

(10) Patent No.: US 6,875,520 B2
(45) Date of Patent: Apr. 5, 2005

(54) MIXTURE OF GRAFTED POLYAMIDE-BLOCK AND FLEXIBLE POLYOLEFIN COPOLYMERS

(75) Inventors: Francois Court, Fontaine l' Abbe (FR); Marius Hert, Serquigny (FR); Patrice Robert, Serquigny (FR); Martin Baumert, Serquigny (FR)

(73) Assignee: Atofina, Puteaux (FR)

( * ) Notice: Subject to any disclaimer, the term of this patent is extended or adjusted under 35 U.S.C. 154(b) by 206 days.

(21) Appl. No.: 10/148,988

(22) PCT Filed: Oct. 8, 2001

(86) PCT No.: PCT/FR01/03100
§ 371 (c)(1),
(2), (4) Date: Feb. 6, 2003

(87) PCT Pub. No.: WO02/28959
PCT Pub. Date: Apr. 11, 2002

(65) Prior Publication Data
US 2003/0199635 A1 Oct. 23, 2003

(51) Int. Cl.⁷ .............................................. C08L 77/00
(52) U.S. Cl. ............................... 428/475.5; 428/474.4; 525/69; 525/179
(58) Field of Search .......................... 428/475.5, 474.4; 525/69, 179, 66

(56) References Cited

U.S. PATENT DOCUMENTS 3,963,799 A  *  6/1976  Starkweather, Jr.
3,976,720 A       8/1976  Hammer et al.
5,160,475 A  * 11/1992  Asano et al. .......... 264/331.17
5,278,229 A  *  1/1994  Asano et al. .................. 525/57
5,770,679 A       6/1998  Hayashi et al.
5,824,745 A      10/1998  Brown
6,451,911 B1 *  9/2002  Bertin et al. .................. 525/63

FOREIGN PATENT DOCUMENTS

| EP | 0364390 | | 4/1990 |
| EP | 0455507 | * | 11/1991 |
| EP | 0568707 | | 11/1993 |
| EP | 1022309 A1 | | 7/2000 |

* cited by examiner

Primary Examiner—Ana L. Woodward
(74) Attorney, Agent, or Firm—Millen, White, Zelano & Branigan, P.C.

(57) ABSTRACT

The invention concerns a mixture comprising by weight, the total being 100%, 1 to 100% if a polyamide block copolymer consisting of a basic polyolefin chain and on an average at least a polyamide graft wherein: the grafts are fixed to the basic chain by the radicals of an unsaturated monomer (X) having a function capable of reacting with a polyamide with amine terminal, the radicals of the unsaturated monomer (X) are fixed to the basic chain by grafting or copolymerization from its double bond; 99 to 0% of a flexible polyolefin with elastic modulus in flexure less than 50 MPa at 23° C. and having a crystalline melting point ranging between 60° C. and 100° C. Said mixtures are useful for making films, tanks, geomembrane protective fabrics produced by extrusion, products obtained by calendering, thermocladding/forming, protective films for electric cables and skins using slush molding technique.

24 Claims, 1 Drawing Sheet

MIXTURE OF GRAFTED POLYAMIDE-BLOCK AND FLEXIBLE POLYOLEFIN COPOLYMERS

FIELD OF THE INVENTION

Figure 1:
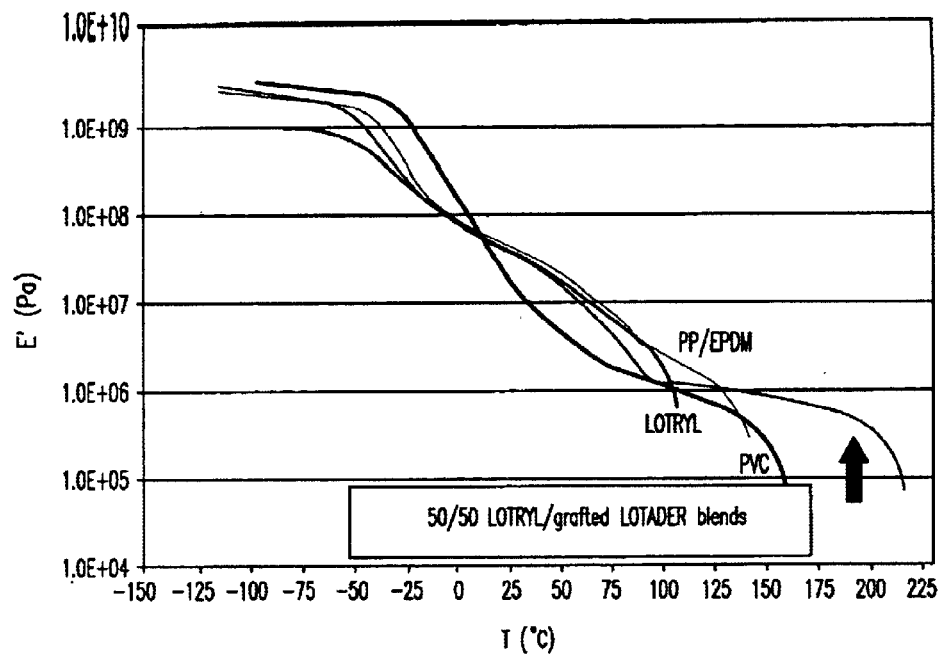

The present invention relates to blends comprising 1 to 100% of (co)polyamide-block graft copolymers and 99 to 0% of flexible polyolefins. The flexible polyolefins may be, for example, ethylene/alkyl (meth)acrylate copolymers, and the (co)polyamide-block graft copolymers consist of a polyolefin backbone to which polyamide grafts are attached. More specifically, the polyamide-block graft copolymer is obtained, for example, by reacting a polyamide having a chain end terminated by an amine group with a polyolefin containing acid anhydride groups incorporated either by polymerization or by grafting of an unsaturated carboxylic acid anhydride.

1. The Technical Problem

Flexible polyolefins, having a flexural elastic modulus of less than 100 MPa at 23° C., have crystalline melting points of between 100° C. and 60° C. and are characterized by a significant drop in elastic modulus as soon as the temperature approaches the melting point. In general, this handicaps their use in an environment characterized by high temperature rises such as, for example, inside a motor-vehicle compartment or exposure to full sunlight. These flexible polyolefins are, for example, copolymers of ethylene and a comonomer such as an alpha-olefin, vinyl acetate or an alkyl (meth)acrylate.

2. The Prior Art

U.S. Pat. No. 3,976,720 describes polyamide-block graft copolymers and their use as a compatibilizer in polyamide/polyolefin blends. Their production starts by polymerizing caprolactam in the presence of N-hexylamine in order to obtain a PA-6 having an amine end group and an alkyl end group. This PA-6 is then attached to a backbone consisting of an ethylene/maleic anhydride copolymer by reacting the anhydride with the amine end group of the PA-6. A polyamide-block graft copolymer is thus obtained which is used in an amount ranging from 2 to 5 parts by weight in order to compatibilize blends comprising 75 to 80 parts of PA-6 and 20 to 25 parts of high-density polyethylene (HDPE). The polyethylene in these blends is dispersed in the form of 0.3 to 0.5 μm nodules in the polyamide.

U.S. Pat. No. 3,963,799 is very similar to the previous patent and specifies that the flexural modulus of blends of PA-6, HDPE and compatibilizer is about 210 000 psi to 350 000 psi, i.e. 1400 to 2200 MPa.

Patent EP 1 036 817 describes graft copolymers similar to those described in the aforementioned US patents and their use as a primer or binder for inks or paints on a polyolefin substrate. For these usages, the copolymers are applied in solution in toluene.

U.S. Pat. No. 5,342,886 describes polymer blends comprising a compatibilizer and, more particularly, polyamide/polypropylene blends. The compatibilizer consists of a polypropylene backbone to which polyamide grafts are attached. The compatibilizer is prepared from a polypropylene homopolymer or copolymer (the backbone) to which maleic anhydride is grafted. Separately, a polyamide with a monoamine terminal group, that is to say one having an amine end group and an alkyl end group, is prepared. Then, by melt blending, the monoamine-terminated polyamide is attached to the polypropylene backbone by reacting the amine functional group with the maleic anhydride.

It has now been discovered that these polyamide-block graft copolymers organize themselves into a structure on a nanometric scale, which gives them exceptional thermomechanical strength properties. Surprisingly, these properties are maintained when these polyamide-block graft copolymers are redispersed in flexible polyolefins such as flexible ethylene polymers.

Thus, when it is desired to increase the operating temperature of a flexible polyolefin, it can be modified by attaching a polyamide graft thereto. If the backbone of the flexible polyolefin does not contain a reactive site for the attachment of the graft, it is firstly necessary to introduce it into the backbone by grafting. Depending on the desired properties, it is not necessary to attach grafts to the entire flexible polyolefin but it is sufficient to do so only over a fraction of this flexible polyolefin [this being done in situ]. It is also possible to blend this modified part with the rest of the flexible polyolefin. It is also possible, in order to increase the operating temperature of a flexible temperature, to add another polyolefin to it, but one containing polyamide grafts. Preferably, this other polyolefin must be compatible with the flexible polyolefin. Depending on the amount added, this polyolefin must preferably have a flexibility such that the flexibility of the blend is not excessively modified.

BRIEF DESCRIPTION OF THE INVENTION

The present invention relates to a blend comprising, by weight, the total being 100%:

1 to 100% of a polyamide-block graft copolymer consisting of a polyolefin backbone and on average at least one polyamide graft, characterized in that copolymer:
  the grafts are attached to the backbone by the residues of an unsaturated monomer (X) having a functional group capable of reacting with an amine-terminated polyamide,
  the residues of the unsaturated monomer (X) are attached to the backbone by grafting or copolymerization from its double bond;
99 to 0% of a flexible polyolefin having an elastic flexural modulus of less than 150 MPa at 23° C. and a crystalline melting point between 60° C. and 100° C.

These polyamide-block graft copolymers organize themselves into a structure on a nanometric scale, which gives them exceptional thermomechanical strength properties. The nanometric nature is even more pronounced when the amount of polyamide with respect to the backbone is within certain proportions.

The blends of the present invention are characterized by an elastic modulus plateau above the melting point of the flexible polyolefin, which results in practice in an improvement in the hot creep properties and the possibility of use at markedly higher temperatures than those of the flexible polyolefin used by itself. Such properties are particularly desirable in cable jackets, in trim for the internal lining of cars, such as heat-sheathed skins, which is thermoformed, calendered or made by slush molding, in tarpaulins and geomembranes exposed to the external environment and in adhesives.

The present invention also relates to an adhesive essentially consisting of the above blends of a graft copolymer and a flexible polyolefin. Preferably, the blend is reduced to a powder, and then this powder is placed between the substrates to be bonded. The powder may be deposited, for example, on one of the substrates or on the other, or even on both substrates, are then pressed against each other while heating sufficiently for the powder to melt. The bond is obtained after cooling.

The present invention also relates to films that can be obtained by extruding the above blends of a graft copolymer and a flexible polyolefin.

The present invention also relates to tarpaulins or geomembranes that can be obtained by extruding the above blends of a graft copolymer and a flexible polyolefin. These tarpaulins or geomembranes advantageously consist of at least one layer of the above blends combined with a backing. Preferably, they are obtained by extrusion-coating them onto a backing which may be a nonwoven, a woven, for example made of PET, or a PET mesh.

The present invention also relates to all products obtained by calendering since the above blends of a graft copolymer and a flexible polyolefin are very easily converted by this process and do not adhere to the rolls of the calendering machine.

The present invention also relates to power cables or telecommunication cables, comprising a protective layer based on the above blends of a graft copolymer and a flexible polyolefin. Advantageously, the layer used in the power cables also contains a fire retardant such as, for example, magnesium hydroxide.

The present invention also relates to the use of the above blends of a graft copolymer and a flexible polyolefin in powder form for the slush molding process, as well as to the articles obtained. The term "slush molding" used by a person skilled in the art denotes a molding process characterized in that powder flows freely on a hot mold (hereafter called slush molding process). Slush molding is used to manufacture skins for dashboards, door panels and consoles in the motor vehicle field. The powder is brought into contact with the hot mold, for example, by the slush molding technique, the powder melting to form a skin. This skin has a very soft feel and has no residual stresses, thereby making it possible, during ageing of the skin, to prevent the risk of cracks appearing caused by residual stresses relaxing. The invention also relates to the articles obtained by this slush molding process and by rotomolding.

DETAILED DESCRIPTION OF THE INVENTION

With regard to the flexible polyolefin, this is an olefin homopolymer or a copolymer of at least one alpha-olefin and of at least one other copolymerizable monomer, provided that, of course, the modulus and crystalline melting point conditions are satisfied.

Advantageously, the flexible polyolefin is chosen from polyethylene homopolymers or copolymers.

By way of comonomers, mention may be made of:

alpha-olefins, advantageously those having from 3 to 30 carbon atoms.

Examples of alpha-olefins having 3 to 30 carbon atoms as possible comonomers include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene. These alpha-olefins may be used by themselves or as a mixture of two or more of them;

esters of unsaturated carboxylic acids such as, for example, alkyl (meth)acrylates, the alkyls possibly having up to 24 carbon atoms.

Examples of alkyl acrylates or methacrylates are especially methyl methacrylate, ethyl acrylate, n-butyl acrylate, isobutyl acrylate and 2-ethylhexyl acrylate;

vinyl esters of saturated carboxylic acids such as, for example, vinyl acetate or vinyl propionate;

unsaturated epoxides.

Examples of unsaturated epoxides are especially:

aliphatic glycidyl esters and ethers such as allyl glycidyl ether, vinyl glycidyl ether, glycidyl maleate, glycidyl itaconate, glycidyl acrylate and glycidyl methacrylate; and alicyclic glycidyl esters and ethers, such as 2-cyclohex-1-ene glycidyl ether, diglycidyl cyclohexene-4-5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate;

unsaturated carboxylic acids, their salts and their anhydrides.

Examples of anhydrides of an unsaturated dicarboxylic acid are especially maleic anhydride, itaconic anhydride, citraconic anhydride and tetrahydrophthalic anhydride;

dienes such as, for example, 1,4-hexadiene.

The flexible polyolefin may comprise several comonomers. By way of example, mention may be made of:

low-density polyethylene (LDPE)

linear low-density polyethylene (LLDPE)

very low-density polyethylene (VLDPE)

polyethylene obtained by metallocene catalysis, that is to say polymers obtained by the copolymerization of ethylene and of an alpha-olefin such as propylene, butene, hexene or octene in the presence of a single-site catalyst generally consisting of a zirconium or titanium atom and of two alkyl cyclic molecules linked to the metal. More specifically, the metallocene catalysts are usually composed of two cyclopentadiene rings linked to the metal. These catalysts are frequently used with aluminoxanes as cocatalysts or activators, preferably methylaluminoxane (MAO). Hafnium may also be used as the metal to which the cyclopentadiene is attached. Other metallocenes may include transition metals of Groups IV A, V A and VI A. Metals from the series of lanthanides may also be used;

EPR (ethylene-propylene-rubber) elastomers;

EPDM (ethylene-propylene-diene) elastomers;

blends of polyethylene with an EPR or an EPDM;

ethylene/alkyl (meth)acrylate copolymers possibly containing up to 60%, and preferably 2 to 40%, by weight of (meth)acrylate;

ethylene/alkyl (meth)acrylate/maleic anhydride copolymers obtained by copolymerizing the three monomers, the proportions of (meth)acrylate being as in the above copolymers and the amount of maleic anhydride being up to 10% and preferably 0.2 to 6% by weight;

ethylene/vinyl acetate/maleic anhydride copolymers obtained by copolymerizing the three monomers, the proportions being the same as in the above copolymer.

By way of example, mention may be made of flexible ethylene copolymers, such as the copolymers obtained by the radical copolymerization at high pressure of ethylene with vinyl acetate, (meth)acrylic esters of (meth)acrylic acid and of an alcohol having from 1 to 24, and advantageously from 1 to 9, carbon atoms, radical terpolymers using, in addition, a third monomer chosen from unsaturated monomers copolymerizable with ethylene, such as acrylic acid, maleic anhydride and glycidyl methacrylate. These flexible copolymers may also be copolymers of ethylene with alpha-olefins containing from 3 to 8 carbon atoms, such as EPRs, very low-density copolymers of ethylene with butene, hexene or octene, having a density of between 0.870 and 0.910 g/cm³ which are obtained by metallocene or Ziegler-Natta catalysis. By the term "flexible polyolefins" we also mean blends of two or more flexible polyolefins.

The invention is particularly useful for ethylene/alkyl (meth)acrylate copolymers. The alkyl may have up to 24 carbon atoms. Preferably, the (meth)acrylates may be chosen from those mentioned above. These copolymers advantageously comprise up to 40%, and preferably 3 to 35%, by weight of (meth)acrylate. Their MFI is advantageously between 0.1 and 50 (at 190° C. –2.16 kg).

Advantageously, the flexural modulus is between 5 and 150.

With regard to the polyamide-block graft copolymer, this may be obtained by reacting a polyamide having an amine terminal group with the residues of an unsaturated monomer X attached by grafting or copolymerization to a polyolefin backbone.

This monomer X may, for example, be an unsaturated epoxide or an anhydride of an unsaturated carboxylic acid. The anhydride of an unsaturated carboxylic acid may be chosen, for example, from maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides. Advantageously, maleic anhydride is used. It would not be outside the scope of the invention to replace all or part of the anhydride with an unsaturated carboxylic acid such as, for example, (meth)acrylic acid. Examples of unsaturated epoxides were mentioned above.

With regard to the polyolefin backbone, a polyolefin is defined as a homopolymer or an alpha-olefin or diolefin copolymer, such as, for example, ethylene, propylene, 1-butene, 1-octene and butadiene. By way of example, mention may be made of:

- polyethylene homopolymers and copolymers, particularly LDPE, HDPE, LLDPE (linear low-density polyethylene), VLDPE (very low-density polyethylene) and metallocene polyethylene;
- propylene homopolymers or copolymers;
- ethylene/alpha-olefin copolymers, such as ethylene/propylene, EPR (ethylene-propylene-rubber) and ethylene/propylene/diene (EPDM);
- styrene/ethylene-butylene/styrene (SEBS), styrene/butadiene/styrene (SBS), styrene/isoprene/styrene (SIS) and styrene/ethylene-propylene/styrene (SEPS) block copolymers;
- copolymers of ethylene with at least one product chosen from salts or esters of unsaturated carboxylic acids, such as alkyl (meth)acrylate (for example methyl acrylate), or vinyl esters of saturated carboxylic acids such as vinyl acetate, the proportion of comonomer possibly being up to 40% by weight.

Advantageously, the polyolefin backbones to which the X residues are attached are polyethylenes grafted by X or ethylene/X copolymers which are obtained, for example, by radical polymerization.

With regard to the polyethylenes to which X is grafted, polyethylene is understood to mean homopolymers or copolymers.

By way of comonomers, mention may be made of:
- alpha-olefins, advantageously those having from 3 to 30 carbon atoms. Examples are mentioned above. These alpha-olefins may be used by themselves or as a mixture of two or more of them;
- esters of unsaturated carboxylic acids such as, for example, alkyl (meth)acrylates, the alkyls possibly having up to 24 carbon atoms; examples of alkyl acrylates or methacrylates are, especially, methyl methacrylate, ethyl acrylate, n-butyl acrylate, isobutyl acrylate and 2-ethylhexyl acrylate;
- vinyl esters of saturated carboxylic acids such as, for example, vinyl acetate or vinyl propionate;
- dienes such as, for example, 1,4-hexadiene;
- the polyethylene may comprise several of the above comonomers.

Advantageously, the polyethylene, which may be a blend of several polymers, comprises at least 50% and preferably 75% (in mol) of ethylene and its density may be between 0.86 and 0.98 g/cm³. The melt flow index (viscosity index at 190° C./2.16 kg) is advantageously between 5 and 100 g/10 minutes.

By way of example of polyethylenes, mention may be made of:
- low-density polyethylene (LDPE);
- high-density polyethylene (HDPE);
- linear low-density polyethylene (LLDPE);
- very low-density polyethylene (VLDPE);
- polyethylene obtained by metallocene catalysis;
- EPR (ethylene-propylene-rubber) elastomers;
- EPDM (ethylene-propylene-diene) elastomers;
- blends of polyethylene with an EPR or an EPDM;
- ethylene/alkyl (meth)acrylate copolymers possibly containing up to 60%, and preferably 2 to 40%, by weight of (meth)acrylate.

The grafting is an operation known per se.

With regard to ethylene/X copolymers, that is to say those characterized in that X is not grafted, these are copolymers of ethylene with X and optionally with another monomer which may be chosen from the comonomers that were mentioned above for the ethylene copolymers intended to be grafted.

Advantageously, ethylene/maleic anhydride and ethylene/alkyl (meth)acrylate/maleic anhydride copolymers are used. These copolymers comprise from 0.2 to 10% by weight of maleic anhydride and from 0 to 40%, and preferably 5 to 40% by weight of alkyl (meth)acrylate. Their MFI is between 5 and 100 (190° C./2.16 kg). The alkyl (meth)acrylates have already been described above. The melting point is between 60 and 100° C.

Advantageously, there are on average at least 1.3, preferably from 1.3 to 10, and better still from 1.3 to 7 mol of X per chain attached to the polyolefin backbone. A person skilled in the art can easily determine this number of moles of X by FTIR analysis.

With regard to the amine-terminated polyamide, a polyamide is understood to mean the product of the condensation:
- of one or more amino acids, such as aminocaproic, 7-amino-heptanoic, 11-aminoundecanoic and 12-aminododecanoic acids of one or more lactams, such as caprolactam, oenantholactam and lauryllactam;
- of one or more salts or mixtures of diamines, such as hexamethylenediamine, dodecamethylenediamine, metaxylylenediamine, bis-p-aminocyclohexylmethane and trimethylhexamethylenediamine with diacids, such as isophthalic, terephthalic, adipic, azelaic, suberic, sebacic and dodecanedicarboxylic acids;
- or of mixtures of several monomers, resulting in copolyamides.

It is also possible to use blends of polyamides or of copolyamides. It is advantageous to use PA-6, PA-11, PA-12, a copolyamide containing 6-type units and 11-type units (PA-6/11), a copolyamide containing 6-type units and 12-type units (PA-6/12) and a copolyamide based on caprolactam, hexamethylenediamine and adipic acid (PA-6/6,6).

Advantageously the grafts are homopolymers consisting of caprolactam residues, 11-aminoundecanoic acid residues or dodecalactam residues or of copolyamides consisting of residues chosen from at least two of the three above monomers.

The degree of polymerization may vary over wide proportions; depending on its value, it is a polyamide or a polyamide oligomer. In the rest of the text, both expressions will be used for the grafts without distinction.

In order for the polyamide to have a monoamine terminal group, it is sufficient to use a chain terminator of formula

characterized in that:

$R_1$ is hydrogen or a linear or branched alkyl group containing up to 20 carbon atoms;

$R_2$ is a linear or branched alkyl or alkenyl group having up to 20 carbon atoms, a saturated or unsaturated cycloaliphatic radical, an aromatic radical or a combination of the above. The chain terminator may, for example, be laurylamine or oleylamine.

Advantageously, the amine-terminated polyamide has a molar mass of between 1000 and 5000 g/mol and preferably between 2000 and 4000 g/mol.

The preferred amino acid monomers or lactams for the synthesis of the monoaminated oligomer as claimed in the invention are chosen from caprolactam, 11-aminoundecanoic acid or dodecalactam. The preferred monofunctional polymerization terminators are laurylamine and oleylamine. The polycondensation defined above is carried out as claimed in the usual known processes, for example at a temperature generally between 200 and 300° C., under vacuum or under an inert atmosphere, and with the reaction mixture being stirred. The average chain length of the oligomer is determined by the initial molar ratio of the polycondensable monomer or lactam to the monofunctional polymerization terminator. In order to calculate the average chain length, it is usual to count one chain terminator molecule per oligomer chain.

The addition of the monoaminated polyamide oligomer to the polyolefin backbone containing X is carried out by reacting an amine functional group of the oligomer with X. Advantageously, X carries an anhydride or acid functional group; thus, amide or imide links are created.

The addition of the amine-terminated oligomer to the polyolefin backbone containing X is preferably carried out in the melt. Thus, it is possible, in an extruder, to mix the oligomer and the backbone at a temperature generally of between 230 and 250° C. The average residence time of the melt in the extruder may be between 15 seconds and 5 minutes, and preferably between 1 and 3 minutes. The efficiency of this addition is evaluated by selectively extracting the free polyamide oligomers, that is to say those which have not reacted to form the final polyamide-block graft copolymer.

The preparation of such amine-terminated polyamides, and their addition to a polyolefin backbone containing X, is described in U.S. Pat. Nos. 3,976,720, 3,963,799, 5,342,886 and FR 2 291 225.

The polyamide-block graft copolymers of the present invention are characterized by a nanostructured organization with polyamide lamellae having a thickness of between 10 and 50 nanometers.

Advantageously, the proportion of polyamide-block graft copolymer is from 5 to 50% per 95 to 50% of flexible polyolefin, respectively.

The blends of the invention have a very good creep resistance at temperatures at least equal to 80° C. and possibly up to 130° C., that is to say they do not fail below 25 kPa.

The blends of the invention may be prepared by melt-blending in extruders (single-screw or twin-screw), Buss kneaders, Brabender mixers and, in general, the usual devices for mixing thermoplastics, and preferably twin-screw extruders. The blends of the invention may also include processing aids such as silica, ethylenebisamide, calcium stearate or magnesium stearate. They may also include antioxidants, UV stabilizers, mineral fillers and coloration pigments.

The blends of the invention may be prepared in one step in an extruder. Introduced into the first zones are the backbone containing X (for example, an ethylene/alkyl (meth)acrylate/maleic anhydride copolymer) and the amine-terminated polyamide, and then a few zones further downstream the flexible polyolefin. It is also possible to introduce all the ingredients dry-blended into the first zone of the extruder.

EXAMPLES

Example 1

An ethylene terpolymer, having a flexural modulus of 30 MPa, a weight-average molar mass $M_w$ of 95 000 g/mol, copolymerized with 28% by weight of ethyl acrylate and 1.2% by weight of maleic anhydride and having a melt flow index of 6 g/10 minutes (at 2.16 kg/190° C.), was mixed in a Leistritz® corotating twin-screw extruder fitted with several mixing zones, having a temperature profile of between 180 and 220° C., with an amine-terminated polycaprolactam of 2500 g/mol molecular mass, synthesized as claimed in the method described in U.S. Pat. No. 5,342,886. This terpolymer contains on average 1 anhydride unit per chain. The proportions introduced into the extruder were such that the backbone polyolefin/amine-terminated polyamide ratio was 80/20 by weight.

The product obtained consisted, by weight, of 50% of the terpolymer to which a polyamide graft was attached, of 14% of the amine-terminated PA-6 and of 36% of the terpolymer.

The product thus produced was analysed by transmission electron microscopy, revealing the polyamide phase by a treatment consisting in making ultrafine sections and then in treating them in an aqueous phosphotungstic acid solution for 30 minutes at 60° C.; the PA appeared dark. The morphology of this alloy was characterized by polyamide particles having a mean size of between 1 and 3 microns. The thermomechanical properties of this product were mediocre and the product broke after a time of less than 1 minute at a stress of 25 kPa at 150° C.

Example 2

A grafting reaction in the extruder was repeated under the conditions in Example 1 with the amine-terminated polyamide of Example 1 and an ethylene/ethyl acrylate/maleic anhydride terpolymer of 50 000 $M_w$, having a respective comonomer weight composition of 77/20/3, a melting point of 76° C., a flexural modulus of 30 MPa and a melt flow index of 70 g/10 minutes (at 2.16 kg/190° C.). This terpolymer contained 2.3 anhydride units per chain. The proportions introduced into the extruder were such that the backbone polyolefin/amine-terminated polyamide ratio was 80/20 by weight and the ratio of the amine functional groups to the maleic anhydride functional groups was 0.35. SEM analysis showed that the polymer obtained was organized in terms of lamellae having a thickness of about 10 nm. This polymer was characterized by an elastic modulus plateau of between 9 and 3 MPa between 80° C. and 180° C. This polymer had an elongation of 8% in the creep test under a stress of 50 kPa at 180° C.

Analysis of the polymer obtained showed that it contained (i) 50% by weight of the terpolymer to which polyamide grafts were attached, (ii) 45% of terpolymer, having a flexural modulus of 30 MPa and not having reacted with the amine-terminated polyamide and (iii) 5% of the amine-terminated PA-6.

Example 3

A grafting reaction as claimed in Example 1 was repeated with an ethylene/butyl acrylate/maleic anhydride radical terpolymer having an $M_w$ of 105 000 and a respective weight composition of 80/17/3, a melting point of 95° C., a flexural modulus of 60 MPa and an MFI of 5 g/10 minutes (at 2.16 kg/190° C.) and a monoaminated PA-6 having a molecular mass of 2400 g/mol. This terpolymer contained 4.8 anhydride units per chain. The proportions introduced into the extruder were such that the backbone polyolefin/amine-terminated polyamide ratio was 80/20 by weight.

The polymer obtained was nanostructured. It was characterized by an elastic plateau of between 10 and 8 MPa between 100° C. and 180° C. This polymer had an elongation of 5% in the creep test under a stress of 200 kPa at 120° C. This copolymer had an elongation of 8% in the creep test under a stress of 50 kPa at 180° C.

Analysis of this polymer showed that it contained more than 50% of the terpolymer to which polyamide grafts were attached via the backbone (the terpolymer) (ii) the other 50% being the terpolymer, of 60 MPa flexural modulus, that had not reacted with the amine-terminated polyamide and a small amount of amine-terminated PA-6.

Example 4

Flexible polyolefins were mixed in a twin-screw extruder, having a temperature profile of between 180 and 220° C., with the nanostructured polymer obtained in Example 3. Next, the creep resistance of these modified polyolefins was tested at various temperatures and under various loads. The analysis of the response of these materials is given in Table 1. This shows the creep behavior of polyolefins modified by a PA-6 block graft copolymer. The compositions by weight were:

EVATANE® 28.05 is an EVA copolymer having a vinyl acetate content of 28% by weight and an MFI (190° C./2.16 kg) of 5 g/10 minutes;

LOTRYL® 30 BA 02 is an ethylene/n-butyl acrylate copolymer having an acrylate weight content of 30% and an MFI of 2 g/10 minutes (190° C./2.16 kg).

Indicated in the "Content" column of Table 1 are the amount of EVATANE®, or of LOTRYL®, and of the polymer obtained in Example 3, respectively. This polymer of Example 3 is the same as a blend containing 50% of terpolymer to which PA grafts are attached, terpolymer, terpolymer having only one graft and a little amine-terminated PA-6.

TABLE 1

| Composition | Content | Temperature ° C. | Stress kPa | Elongation (%) | Time |
|---|---|---|---|---|---|
| EVATANE 28.05 | 100/0 | 120 | 25 | Failure | 36 s |
| | 100/0 | 100 | 25 | Failure | 70 s |
| | 100/0 | 80 | 25 | Failure | 2 min. 30 |
| | 70/30 | 120 | 25 | Failure | 120 s |
| | 70/30 | 100 | 25 | Failure | 4 min. 30 |
| | 70/30 | 80 | 25 | 30% | >20 min. |
| | 50/50 | 80 | 25 | 10% | >20 min. |
| LOTRYL 30 BA 02 | 100/0 | 120 | 25 | Failure | 60 s |
| | 100/0 | 100 | 25 | Failure | 90 s |
| | 100/0 | 80 | 25 | 225% | >20 min. |
| | 80/20 | 100 | 25 | Failure | 4 min. |
| | 80/20 | 80 | 25 | 50% | >20 min. |
| | 70/30 | 120 | 25 | 80% | >20 min. |
| | 70/30 | 100 | 25 | 70% | >20 min. |
| | 70/30 | 80 | 25 | 15% | >20 min. |
| | 50/50 | 120 | 100 | 30% | >20 min. |

Example 5

I) Characteristics of the Products Used 1.1) Polyolefin Backbone Comprising Maleic Anhydride The LOTADER® used for synthesizing the PA-grafted LOTADER was an ethylene/acrylic ester/maleic anhydride terpolymer whose characteristics were:

| Name of the product | Theoretical % of MAH by mass | Theoretical % of BA by mass | Theoretical MFI (2.16 kg/190° C.) | Density (g/cm³) | Melting point (° C.) |
|---|---|---|---|---|---|
| LOTADER 3410 | 3.3 to 3.5 | 37 | 3 to 6 | 0.9 | 95 |

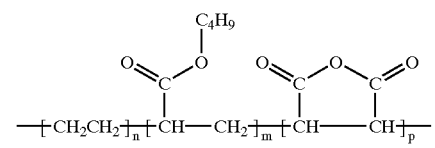

1.2) Characteristics of the Amine-terminated Polyamide Oligomer
the oligomer used was a mono-NH$_2$-terminated nylon-6 whose formula is:

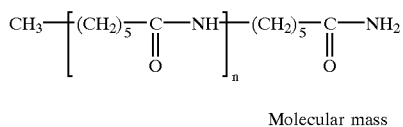

| | Molecular mass |
|---|---|
| Mono-NH$_2$ PA-6 | 2445 |

1.3) Characteristics of the Flexible Polyolefin (LOTRYL®)
The LOTRYL® used was an ethylene/butyl acrylate copolymer whose characteristics are:

| Name of the product | Theoretical % of BA by mass | Theoretical MFI (2.16 kg/190° C.) | Density (g/cm$^3$) | Melting point (° C.) |
|---|---|---|---|---|
| LOTRYL 30 BA 02 | 30 | 2 | 0.93 | 78 |

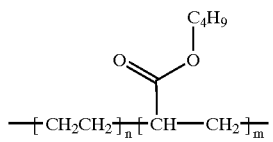

II) Experimental Part
A) Two-step process: the attachment of the amine-terminated polyamide to the backbone was firstly carried out and then the polymer was diluted in the flexible polyolefin.
A1) Step of synthesizing the mono-NH$_2$-terminated-PA-grafted LOTADER (attachment of the amine-terminated polyamide to the backbone). Attachment is carried out in a Leistritz extruder under the following conditions (by weight):
80% LOTADER® 3410 and 20% of mono-NH$_2$-terminated PA-6 were dry-blended and introduced into the extruder:

| Temperature profile of zones 1 to 9 | 200–210–220–220–220–210–200–180–180° C. |
|---|---|
| Screw speed | 75 rpm |
| Output | 10 kg/h |

A2) Step of diluting the mono-NH$_2$-terminated-PA-grafted LOTADER in the LOTRYL®.

The dilution in the LOTRYL 30BA02 was carried out in a Leistritz extruder at 220° C.; 50 parts by weight of the product obtained in step A1 and 50 parts of LOTRYL® were used.

B) One-step process: the amine-terminated polyamide was attached to the backbone and simultaneously diluted in the flexible polyolefin in the extruder. The grafting and the diluting were carried out at the same time in the Leistritz extruder under the following conditions (by weight):

40% of LOTADER® 3410, 10% of mono-NH$_2$-terminated PA-6 and 50% of LOTRYL® 30BA02 were dry-blended and compounded:

| Temperature profile of zones 1 to 9 | 200–210–220–220–220–210–200–180–180° C. |
|---|---|
| Screw speed | 75 rpm |
| Output | 10 kg/h |

III) Evaluation of the Thermomechanical Properties of the Compounds: Comparison Between One-step and Two-step Compounds A) Thermomechanical properties of the compounds: creep resistance (internal method).

This property was evaluated by measuring the creep resistance at 100° C. and 120° C. under various loads. IFC (Institut Francais du Caoutchouc [French Rubber Institute]) test pieces were cut from plaques 2 mm in thickness produced by compression-molding in an Enerpac® press. The PA-grafted LOTADER plaques and the diluted products were produced at 240° C. The test piece had to withstand a load of 1 bar at 100° C. and 0.5 bar at 120° C. for at least 20 minutes.

B) Mechanical properties of the compounds: the mechanical properties were evaluated by measuring the tensile strength and elongation at break (ISO 527 dumbbells; pull rate 100 mm/minute).

The results are given in Table 2 below.

TABLE 2

| Product | Creep at 100° C. under 100 kPa | Creep at 120° C., under 50 kPa | Creep at 120° C. under 100 kPa | Tensile strength and elongation at break |
|---|---|---|---|---|
| LOTADER 3410 | Creep at 2 min. Under 25 kPa | Creep at 70 s Under 25 kPa | Creep | 10 MPa 700% |
| LOTRYL 30BA02 | ≻ Creep at 90 s Under 25 kPa | Creep at 60 s Under 25 kPa | Creep | 6 MPa 850% |

TABLE 2-continued

| Product | Creep at 100° C. under 100 kPa | Creep at 120° C., under 50 kPa | Creep at 120° C. under 100 kPa | Tensile strength and elongation at break |
|---|---|---|---|---|
| Obtained in two steps | > 20 min., 30% elongation | > 20 min., 15% elongation | > 20 min., 30% elongation | 10.2 +/- 0.6 MPa 501 +/- 20% |
| Obtained in one step | > 20 min., 25% elongation | > 20 min., 20% elongation | > 20 min., 39% elongation | 11.0 +/- 1.1 MPa 541 +/- 37% |

IV) Results of the Morphological Evaluation

Ultrathin sections were cut at −100° C. and then treated in a 2% aqueous phosphotungstic acid solution for 30 minutes at 60° C. before being examined by transmission electron microscopy. The difference between the products obtained in one step and two steps is small: in both cases, a homogeneous dispersion of the LOTADER containing the polyamide grafts was obtained, the one-step process resulting in a more visible structuration of the latter.

Example 6: Adhesive

The following products were used:
LOTADER® 7500, an ethylene/ethyl acrylate/maleic anhydride terpolymer:

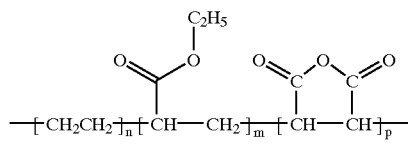

Properties of LOTADER 7500:

| % mass of MAH (maleic anhydride) | % mass of ethyl acrylate | MFI[a] (melt flow index) | $M_n$ | $M_w$ | $M_w/M_n$ | Shore A hardness | Melting point (° C.) |
|---|---|---|---|---|---|---|---|
| 2.9 | 17.5 | 70 | 8000 | 50000 | 6.25 | 82 | 83 |

[a](2.16 kg/190° C.).

PA-6/11-g-LOTADER: this is the LOTADER 7500 grafted with 20% of mono-NH$_2$-terminated 6/11 copolyamide produced by extrusion in a Leistritz extruder. The 6/11 copolyamide had a 55/45 (caprolactam/11-aminoundecanoic) composition, with an $M_n$ of 3200 g/mol, and is mono-NH$_2$-terminated.

Properties of LOTADER 7500 grafted with PA-6/11 (6/11-7500):

| % mass of PA-6/11 | MFI[a] | Tensile strength TS (MPa) | Elongation at break EB (%) | Melting point (° C.) |
|---|---|---|---|---|
| 20 | 9 | 13 | 400 | 83,151 |

[a](2.16 kg/190° C.).

The two products were cryogenically ground.
Tests were carried out on a dusting apparatus.
Three types of backing were tested:
PP carpet on aluminum foil with polyester reinforcement;
gray nonwoven on PE foam;
gray nonwoven on white felt.

The PP carpet on aluminum foil was chosen inter alia for its thermal resistance so as to be able to carry out thermal resistance tests at 120° C.

The application weight was fixed at 20 g/m³ and the temperature of the fixing press was varied, namely 100, 120, 140, 160, 180 and 200° C. A test with steam bonding was also carried out.

In the following tables, the tests carried out are listed. The adhesion is assessed qualitatively (the symbol − indicates a poor result, the symbol + indicates a good result, the symbol ++ indicates a better result, etc.).

Bonding: PP carpet on aluminum foil with polyester reinforcement

| Press 15 s/0.35 bar | LOTADER 7500 | LOTADER 7500 grafted with 6/11 coPA |
|---|---|---|
| 100° C. | ++ | |
| 120° C. | ++ | |
| 140° C. | ++ | + |
| Thermal resistance (120° C.) | Delamination after 9 min | No delamination |

Bonding: Gray nonwoven on PE foam

| Press 15 s/0.35 bar | LOTADER 7500 | LOTADER 7500 grafted with 6/11 coPA |
|---|---|---|
| 100° C. | − | |
| 120° C. | − | |
| 140° C. | ++ | + |

Bonding: Gray nonwoven on white felt

| Press 15 s/0.35 bar | LOTADER 7500 | LOTADER 7500 grafted with 6/11 coPA |
|---|---|---|
| 100° C. | ++ | |
| 120° C. | ++ | − |
| 140° C. | ++ | + |
| 160° C. | | ++ |
| 180° C. | | ++ |
| 200° C. | | ++ |

Example 7: Tarpaulins

I—Characteristics of the Products Used

I.1—Characteristics of the LOTADER Based Used for the Grafting

This is an ethylene/butyl acrylate/maleic anhydride terpolymer containing 20% by weight of butyl acrylate, the characteristics of which are:

| Name of the product | Theoretical % of MAH by mass | Theoretical MFI (190° C./ 2.16 kg) | Measured MFI (190° C./ 2.16 kg) | Measured MFI (190° C./ 5 kg) | Measured MFI (230° C./ 2.16 kg) | Measured MFI (230° C./ 5 kg) | Density (g/cm$^3$) | Melting point (° C.) | $M_n$ |
|---|---|---|---|---|---|---|---|---|---|
| LOTADER 3410 | 3.1 | 5 | 6.8 | 25.6 | 18.57 | 61.5 | 0.940 | 95 | 23000 |

(MFI is the Melt Flow Index)

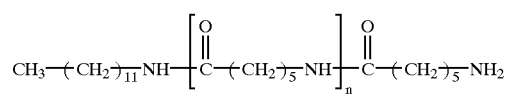

I.2—Characteristics of the Oligomer Used

The oligomer used was a mono-$NH_2$-terminated nylon-6 of expanded formula:

$$CH_3-(CH_2)_{11}-NH-\left[\overset{O}{\underset{\|}{C}}-(CH_2)_5-NH\right]_n-\overset{O}{\underset{\|}{C}}-(CH_2)_5-NH_2$$

This prepolymer had a molecular mass of 2500 g/mol.

I.3—Characteristics of the LOTRYL Polymers Used for Diluting the PA-grafted LOTADER Polymers

These are ethylene/methyl acrylate or ethylene/butyl acrylate copolymers, the characteristics of which are:

| Name of product | Theoretical % of MA or BA by mass | Theoretical MFI (190° C./2.16 kg) | Measured MFI (230° C./2.16 kg) | Measured MFI (230° C./5 kg) | Density (g/cm$^3$) | Melting point (° C.) |
|---|---|---|---|---|---|---|
| LOTRYL 18MA 02 | 18% MA | 2 | — | — | | 87 |
| LOTRYL 30MA 02 | 30% BA | 2 | 4.8 | 14.8 | 0.930 | 78 |
| LOTRYL 17BA 02 | 17% BA | 7 | | | | |

MA = methyl acrylate;
BA = butyl acrylate.

II—Results

II.1—Preparation of the Products

II.1.1—Operating Method (General Extrusion Conditions)

The extruder used to manufacture the grafts and to make the dilutions was a co-rotating twin-screw Leistritz extruder, model LSM 30.34.

Extrusion Conditions:

screw profile: G01;

water on barrel, venting in zone 7 and water cooling;

total throughput: 15 to 18 kg/h;

screw speed: 100 to 125 rpm;

Separate introduction of the reactants (one for the PA-6 powder and one for the granulated blend(s));

The temperature profiles used were:

| Profile | Z1 | Z2 | Z3 | Z4 | Z5 | Z6 | Z7 | Z8 | Z9 |
|---|---|---|---|---|---|---|---|---|---|
| Other examples | 200° C. | 210° C. | 230° C. | 240° C. | 240° C. | 220° C. | 210° C. | 200° C. | 180° C. |
| Examples with PA-grafted LOTADER | 200° C. | 220° C. | 240° C. | 240° C. | 240° C. | 240° C. | 220° C. | 200° C. | 180° C. |

The extruder was conditioned for 5 minutes without incident. Sampling took place thereafter;

The final packaging of the products was done in sealed aluminum bags labeled after treatment in a vacuum oven overnight at 70° C.

II.1.2—Results of the Evaluation of the Compounds

Mechanical properties of the materials on compression-molded plaques.

In the table below, 3410-6/denotes the PA-6-grafted LOTADER 3410.

Comparison of the Thermal Resistance with that of PVC/PP/EPDM

The attached figures show the elastic modulus as a function of temperature for the 50/50 mixtures of LOTRYL 30BA 02 and PA-grafted LOTADER 3410, for PVC and for PP/EPDM: it may be seen that, above 140° C., the storage modulus of the 50/50 blends of LOTRYL 30BA 02 and PA-grafted LOTADER 3410 is higher than that of the PVC and PP/EPDM products. In addition, examining the loss tangent plotted as a function of temperature shows that the cold properties of the 50/50 blends of LOTRYL 30BA 02

|  | PVC | PP/EDPM | 30BA02 | 17BA07 | 18MA02 | 3410-6/30BA 02 in 30/70 proportions (weight) | 3410-6/30BA 02 in 50/50 proportions (weight) | 3410-6/18MA 02 in 50/50 proportions (weight) | 3410-6 |
|---|---|---|---|---|---|---|---|---|---|
| Tensile strength (MPa) | 16.0 | 13.7 | 6 | 13 | 15 | 8.2 | 10.2 | 14.0 | 16.5 |
| Elongation at break (%) | 250 | 590 | 850 | 800 | 700 | 520 | 500 | 620 | 460 |
| Flexural modulus (MPa) | 20 | 46[1] | 9 | 40[2] | 50[2] | 29[1] | 44[1] |  | 91[1] |
| Shore A hardness | 75 | n.m. | 75 |  |  | 85 | 90 | 93 | 95 |
| Shore D hardness | 25 | n.m. |  | 33 | 25 | 28 | 30 | 37 | 39 |
| Density (g/cm$^3$) |  | n.m. | 0.93 | 0.94 | 0.94 |  |  |  | 0.971 |
| MFI (230° C./2.16 kg) | 60 | n.m. | 4.8 | n.m. | n.m. | 5.0 | 3.9 | 4.0 | 1.5 |
| Melting point (° C.) |  |  | 78 | 91 | 87 |  |  |  |  |
| MFI (230° C./5 kg) | n.m. | n.m. | 14.8 | n.m. | n.m. | 21 | 19 | 20 | 10 |

[1] determined by DMA: E' = (σ/ε)cos(δ) at 25° C.;
[2] determined as claimed in the DIN 53457 (ASTM D790) standard;
n.m. = not measured.

Thermomechanical Properties of the Materials Measured on Compression-molded or Injection-molded Plaques Compression-molded Plaques

| Product | Creep elongation (100° C./0.25 bar) (%) | Creep elongation (120° C./0.5 bar) (%) | Creep elongation (140° C./0.5 bar) (%) |
|---|---|---|---|
| PP/EDPM | 0 | 0 | ∞ |
| PVC |  | 20 | ∞ |
| 17BA 07 | ∞ | ∞ | ∞ |
| 18MA 02 | ∞ | ∞ | ∞ |
| 30BA 02 | ∞ | ∞ | ∞ |
| 3410-6/30BA 02 30/70 | 70 | ∞ | ∞ |
| 3410-6/30BA 02 50/50 | 5 | 15 | 25 |
| 3410-6/18BA 02 50/50 | 5 | 10 | 35 |
| 3410-6 | 0 | 0 | 3 |

The elongation is measured after 15 minutes.

BRIEF DESRCIPTION OF THE DRAWINGS

The attached figures show the elastic modulus as a functionof temperature for different mixtures.

Figure 2:
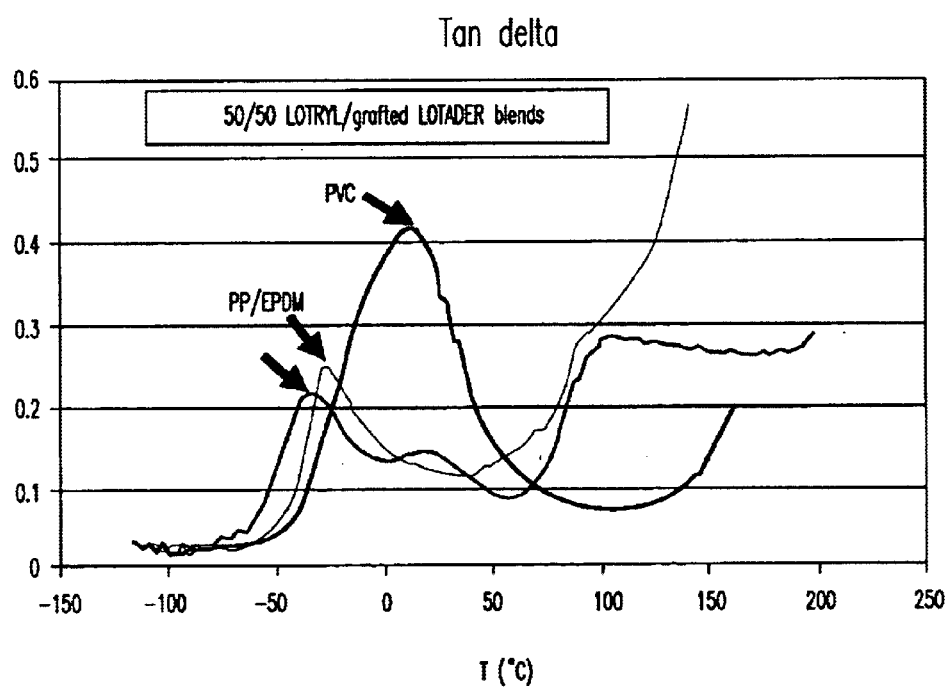

FIG. 2 also plots the lost tangent as a function of temperature.

and PA-grafted LOTADER 3410 are higher than the other products, PVC and PP/EPDM.

II.2 Preparation and Evaluation of Tarpaulins

The coating was carried out on a SAMAFOR® 4EX. Several backings were used: PET mesh, PP nonwoven and PET woven. The drawability test showed that the product is extrudable up to 100 m/min. 2×100 g/m$^2$ sheets were produced at 30 m/min.

The processing and the adhesion of the 50/50 blends of LOTRYL 30BA 02 and PA-grafted LOTADER 3410 are comparable to LOTRYL.

Example: 8 Calendering

The 50/50 blend of LOTRYL 30BA 02 and PA-grafted LOTADER 3410 of the previous example was used. Its characteristics were:

| | |
|---|---|
| Tensile strength in MPa | 8.6 |
| Elongation at break in % | 630 |
| Shore A hardness | 91 |
| Shore D hardness | 35 |
| MFI (230° C./2.16 kg) | 4 |
| Creep resistance at 120° C. under a load of 0.5 bar | >15 min. with an elongation of 15% |
| E' (120° C.) in MPa | 1.08 |
| E' (25° C.) in MPa |  |
| Density in g/cm$^3$ | 0.97 |

3—Calendering Tests

The calendering tests were carried out at temperatures between 120 and 200° C.

| Temperature of the rolls | Speed of the rolls | Material homogeneity (transparency) | Appearance of the calendered sheet | Comments |
|---|---|---|---|---|
| 120° C. | Front: 20 rpm<br>Rear: 20 rpm | poor | Shark skin | |
| 140 | Front: 20 rpm<br>Rear: 20 rpm | average | idem | |
| 160 | Front: 20 rpm<br>Rear: 20 rpm | good | Beautiful appearance | |
| 180 | Front: 20 rpm<br>Rear: 20 rpm | good | Slight bulk yellowing | |
| 200 | Front: 20 rpm<br>Rear: 20 rpm | good | Bulk yellowing | Product sticks to the metal (rollers and blades) |

It may be seen that between 120 and 140° C. the product does not have a beautiful appearance and that it remains opaque, a sign of poor homogeneity of the blend; between 180 and 200° C. the product yellows and sticks to the metal.

The best working temperature for this type of polymer is about 160° C., the material not oxidizing and not adhering to the rolls of the calender.

Example: 9 Cables

The material used was LOTADER 3410 either grafted with a mono-NH$_2$-terminated PA-6, as in Example 7, or grafted with a 6/12 coPA having the following characteristics:

| | PA-6/PA-12 weight ratio | Melting point (° C.) |
|---|---|---|
| Mono-NH$_2$—terminated 6/12 coPA | 40/60 | 133 |

Characteristics of the Other Constituents

| Name | Melting point (° C.) | Melt flow index MFI (190° C./ 2.16 kg) | Tensile strength in MPa | Elongation at break in % |
|---|---|---|---|---|
| EVA 2803 (ethylene/vinyl acetate copolymer) | 75 | 3–4.5 | 33 | 700–1000 |
| LOTRYL 3OBA 02 | 78 | 2 | 6 | 850 |
| LOTADER 3200 | | | | |

LOTADER 3200 is a terpolymer containing 9% by weight of butyl acrylate and 2% by weight of maleic anhydride.

Characteristics of the Filler Used

The filler used was MAGNIFIN H10 magnesium hydroxide Mg(OH)$_2$. This filler has a high thermal stability and can be used to 340° C., water being liberated at a temperature of 350° C.

II.6) Compositions for the Tests (Theoretical Values)

| Product name | Control formulation | Test 1 | Test 2 | Test 3 |
|---|---|---|---|---|
| EVA 28-03 | 16.65% | | 16.2 | |
| LOTADER 3200 | | 11.0 | | |
| CLEARPLEX (VLDPE) | 9.1 | 8.1 | 11.1 | |
| PA-6-grafted LOTADER | | 10.7 | 10.7 | 12 |
| PA-6/12-grafted LOTADER | | | | |
| LOTRYL 3OBA 02 | | 24.9 | | 28 |
| MAGNIFIN H10 (Mg(OH)$_2$) | 63 | 56.1 | 61.7 | 60 |
| SANTONOX R | 0.25 | 0.2 | | |
| IRGANOX B 225 | | | | 0.3 |

Evaluation of the (Thermo)Mechanical Properties of the Compounds

A) Thermomechanical Properties of the Compounds

Creep Resistance (Internal Method)

This property was evaluated by measuring the creep resistance at 180° C. and 200° C. under various loads. IFC (Institut Française du Caoutchouc [French Rubber Institute]) test samples were cut from plaques 2 mm in thickness produced by calendering and compression-molding. The test specimen must withstand a load for at least 20 minutes.

| | Control | Test 1 | Test 2 | Test 3 | Test 4 | Test 5 |
|---|---|---|---|---|---|---|
| Compression temperature (° C.) | 170° C. | 250° C. | 250° C. | 170° C. | 250° C. | 250° C. |

B) Mechanical Properties of the Compounds

The mechanical properties were evaluated by measuring the tensile strength and the elongation at break (ISO 527 dumbbells; pull rate 100 mm/min).

C) 600° C. Ash Content

The ash contents were measured at the LEM (Materials Testing Laboratory) on a TXG CEM 300 apparatus.

III) Results of the Evaluations of the Compounds

III.1) Mechanical and Thermomechanical Properties

| | Expected filler content | Tensile strength in MPa | Elongation at break in % | 180° C. creep at 0.5 bar | 180° C. creep at 1 bar |
|---|---|---|---|---|---|
| Control | 60 | 13.6 | 143 | Broke at 45 s | Broke at 30 s |
| Test 1 | 60 | 10.5 | 52.7 | 5% elong. 20 min. | 5% elong. 20 min. |
| Test 2 | 60 | 12.5 | 150 | 5% elong. >20 min. | Broke at 4 min. |
| Test 3 | 60 | 10.4 | 40 | 5% elong. >20 min. | Broke at 5. |

Example: 10 Slush Molding

LOTADER 7500 grafted with 20% mono-NH$_2$-terminated PA-11 of $M_n$=2500 g/mol was used.

LOTRYL 35BA 40 is an ethylene/butyl acrylate copolymer containing 35% by weight of butyl acrylate and having an MFI of 40 g/10 min (190° C./2.16 kg).

The products were cryogenically ground after extrusion.

|  | Control | Test 1 | Test 2 | Test 3 | Test 4 |
|---|---|---|---|---|---|
| Composition by weight | PVC | 50% 7500-11<br>35% 30BA 02<br>15% 35BA 40 | 75% 7500-11<br>25% 35BA 40 | 50% 7500-11<br>50% 35BA 40 | 100% 7500-11 |
| Tensile strength (MPa) | 16 | 9.2 | 6.8 | 4.5 | 10 |
| Elongation at break (%) | 250 | 500 | 250 | 225 | 300 |
| Shore A hardness | <85 | 84 | 89 | 82 | 89 |
| Shore D hardness | <25 | 25 | 29 | 24 | 35 |
| MFI at 230° C./2.16 kg (g/10 min) | >40 | 25 | 61 | 69 | 70 |
| Creep at 120° C./0.5 bar after 15 min (%) | 20 | 1 | 0 | 6 | 0 |

The products were manufactured by extrusion in a Leistritz® machine;

7500-11 denotes LOTADER 7500 grafted with PA-11;

30BA 02 and 35BA 40 denote LOTRYL ethylene/alkyl acrylate copolymers.

What is claimed is:

1. A polymeric blend consisting essentially of, by weight, the total being 100%:
    1 to less than 100% of a polyamide graft copolymer consisting essentially of a polyolefin backbone and on average at least one polyamide graft per said polyolefin backbone, in which copolymer:
        the grafts are attached to the backbone by the residues of an unsaturated monomer (X) having a functional group capable of reacting with an amine-terminated polyamide,
        the residues of the unsaturated monomer (X) are attached to the backbone by grafting or copolymerization from its double bond; and
    99 to above 0% of a flexible polyolefin having an elastic flexural modulus of less than 150 MPa at 23° C. and a crystalline melting point between 60° C. and 100° C., said flexible polyolefin being an olefin homopolymer or a copolymer of at least one alpha-olefin and of at least one copolymerizable monomer being of a different alpha-olefin, an ester of an unsaturated carboxylic acid, a vinyl ester of a saturated carboxylic acid, an unsaturated epoxide, an unsaturated carboxylic acid or salt thereof or anhydride thereof, or a diene, said polymeric blend being characterized by an elastic modulus plateau above the melting point of the flexible polyolefin.

2. A blend as claimed in claim 1, wherein the flexible polyolefin comprises an ethylene/alkyl (meth)acrylate copolymer.

3. A blend as claimed in claim 2, wherein X comprises an unsaturated carboxylic acid anhydride.

4. A blend as claimed in claim 3, containing on average at least 1.3 mol of X attached to the polyolefin backbone.

5. A blend as claimed in claim 4, wherein the at least one polyamide graft comprises at least one homopolymer of at least one monomer selected from the group consisting of caprolactam residues, 11-aminoundecanoic acid residues, dodecylactam residues, and copolyamides of residues chosen from at least two of the three above monomers.

6. A blend as claimed in claim 5, having proportions by weight of 5 to 50% polyamide graft copolymer per 95 to 50% of flexible polyolefin.

7. A blend according to claim 2, wherein the ethylene/alkyl (meth)acrylate copolymer comprises 3–35% by weight of (meth)acrylate.

8. An adhesive, consisting essentially of a blend as claimed in claim 7.

9. An adhesive as claimed in claim 8, in powder form.

10. A blend as claimed in claim 7, wherein the polyolefin backbone containing X comprises a member selected from the group consisting of ethylene/maleic anhydride and ethylene/alkyl (meth)acrylate/maleic anhydride copolymers.

11. A blend as claimed in claim 1, wherein X comprises an unsaturated carboxylic acid anhydride.

12. A blend as claimed in claim 11, wherein the polyolefin backbone containing X is chosen from ethylene/maleic anhydride and ethylene/alkyl (meth)acrylate/maleic anhydride copolymers.

13. A blend as claimed in claim 1, containing on average at least 1.3 mol of X attached to the polyolefin backbone.

14. A blend as claimed in claim 13, containing on average between 1.3 and 10 mol of X attached to the polyolefin backbone.

15. A blend as claimed in claim 1, wherein the at least one polyamide graft comprises at least one homopolymer of at least one monomer selected from the group consisting of caprolactam residues, 11-aminoundecanoic acid residues, dodecylactam residues, and copolyamides of residues chosen from at least two of the three above monomers.

16. A blend as claimed in claim 1, wherein the polyamide grafts have a molar mass between 1000 and 5000 g/mol.

17. A blend as claimed in claim 1 having proportions by weight of 5 to 50% polyamide-block graft copolymer per 95 to 50% of flexible polyolefin.

18. An adhesive, consisting essentially of a blend as claimed in claim 1.

19. An adhesive as claimed in claim 18, in powder form.

20. A film, comprising a blend as claimed in claim 1.

21. A tarpaulin or geomembrane, comprising at least one layer of a blend as claimed in claim 1.

22. A product obtained by calendering a blend as claimed in claim 1.

23. A power cable or telecommunications cable, comprising a protective layer comprising a blend as claimed in claim 1.

24. A process comprising slush molding a blend according to claim 1 in powder form.

* * * * *

UNITED STATES PATENT AND TRADEMARK OFFICE
CERTIFICATE OF CORRECTION

PATENT NO.    : 6,875,520 B2
DATED         : April 5, 2005
INVENTOR(S)   : Francois Court It is certified that error appears in the above-identified patent and that said Letters Patent is hereby corrected as shown below:

Column 21,
Line 62, reads "dodecylactam" should read -- dodecalactam --

Column 22,
Line 46, reads "dodecylactam" should read -- dodecalactam --

Signed and Sealed this

Nineteenth Day of July, 2005

JON W. DUDAS
*Director of the United States Patent and Trademark Office*